(12) United States Patent
Lorenzi et al.

(10) Patent No.: US 11,597,308 B2
(45) Date of Patent: Mar. 7, 2023

(54) COVERING SYSTEM FOR MOTOR VEHICLE SEAT MEMBER AND METHOD FOR MANUFACTURING SUCH A COVERING SYSTEM

(71) Applicant: Faurecia Sièges d'Automobile, Nanterre (FR)

(72) Inventors: Fabrice Lorenzi, Vy les Lure (FR); Etienne Poulet, St Bresson (FR); Jean-Yves Piederriere, Angerville (FR)

(73) Assignee: Faurecia Sièges d'Automobile, Nanterre (FR)

( * ) Notice: Subject to any disclaimer, the term of this patent is extended or adjusted under 35 U.S.C. 154(b) by 0 days.

(21) Appl. No.: 16/419,497

(22) Filed: May 22, 2019

(65) Prior Publication Data

US 2019/0359099 A1    Nov. 28, 2019

(30) Foreign Application Priority Data

May 23, 2018  (FR) ...................................... 18 54332

(51) Int. Cl.
    *A47C 7/18*    (2006.01)
    *B60N 2/70*    (2006.01)
    *B60N 2/58*    (2006.01)

(52) U.S. Cl.
    CPC .......... B60N 2/5891 (2013.01); B60N 2/5883 (2013.01)

(58) Field of Classification Search
CPC ....... B60N 2/5891; B60N 2/58; B60N 2/5883
See application file for complete search history.

(56) References Cited

U.S. PATENT DOCUMENTS

| 2,458,588 | A | * | 1/1949 | Gordon | A47C 31/023 428/102 |
| 3,563,837 | A | * | 2/1971 | Smith et al. | A63B 6/00 428/71 |
| 4,384,541 | A | * | 5/1983 | Schneider | A47C 31/026 112/421 |
| 4,747,638 | A | * | 5/1988 | Saito | B60N 2/58 297/452.35 |

(Continued)

FOREIGN PATENT DOCUMENTS

FR    3036346 A1    11/2016
FR    3040931 A1    3/2017

(Continued)

OTHER PUBLICATIONS

French Search Report with English translation corresponding to French No. FR 1854332, dated Jan. 31, 2019, 6 pages.

(Continued)

*Primary Examiner* — Shin H Kim
(74) *Attorney, Agent, or Firm* — Reising Ethington P.C.

(57) ABSTRACT

A method for manufacturing a covering system for a motor vehicle seat member includes the steps of: providing a support, a cover and a pad; associating the support with the cover, the pad being left free between the support and the cover; and creating longitudinal seam lines, one on either side of the pad. The longitudinal seam lines join together the support and the cover. The longitudinal seam lines form straight segments, extending in a transverse direction towards the first pad, and join together the support, the cover, and the first pad.

19 Claims, 7 Drawing Sheets

(56) References Cited

U.S. PATENT DOCUMENTS

| | | | | |
|---|---|---|---|---|
| 4,757,773 A * | 7/1988 | Nomura | ................ | D05B 35/102 |
| | | | | 112/470.07 |
| 5,501,165 A * | 3/1996 | Nagashima | ............ | D05B 35/08 |
| | | | | 112/475.06 |
| 5,799,600 A * | 9/1998 | Reuben | ................ | A47G 9/0207 |
| | | | | 112/475.08 |
| 6,893,087 B2 * | 5/2005 | Hancock | .................... | B62J 1/12 |
| | | | | 297/219.11 |
| 7,448,643 B2 * | 11/2008 | Kuettner | ............ | B60R 21/2342 |
| | | | | 280/728.3 |
| 8,584,333 B2 * | 11/2013 | Marques | .............. | B60N 2/5883 |
| | | | | 29/91 |
| 9,340,134 B2 * | 5/2016 | Posnien | ................ | B60N 2/5883 |
| 10,576,853 B2 * | 3/2020 | Marques | ............. | B60N 2/5891 |
| 10,604,045 B2 * | 3/2020 | Marques | ............. | B60N 2/7017 |
| 2013/0140867 A1 * | 6/2013 | Posnien | ................... | B60N 2/58 |
| | | | | 297/452.1 |
| 2013/0187432 A1 * | 7/2013 | Marques | .................. | B60N 2/70 |
| | | | | 297/452.58 |
| 2019/0359099 A1 * | 11/2019 | Lorenzi | ................ | B60N 2/5883 |
| 2020/0032441 A1 * | 1/2020 | Albrecht | ................ | D03D 15/56 |

FOREIGN PATENT DOCUMENTS

| | | | |
|---|---|---|---|
| FR | 3045525 A1 | 6/2017 | |
| WO | 2012117175 A1 | 9/2012 | |

OTHER PUBLICATIONS

Written Opinion in French with English translation corresponding to French No. FR 1854332, dated Jan. 31, 2019, 8 pages.

\* cited by examiner

COVERING SYSTEM FOR MOTOR VEHICLE SEAT MEMBER AND METHOD FOR MANUFACTURING SUCH A COVERING SYSTEM

TECHNICAL FIELD

The present invention relates to a method for manufacturing a covering system for a motor vehicle seat member and to such a covering system.

BACKGROUND

A motor vehicle seat member, typically a seating portion, a backrest, or a headrest, comprises a rigid structure (or frame), a padding supported by the rigid structure, and a covering system which covers the padding and forms the physical interface between seat and seat occupant.

Generally, the covering system has certain specific patterns for aesthetic reasons. These patterns also make it possible to distinguish one motor vehicle seat from another.

U.S. Pat. No. 8,584,333 B2 describes a method for manufacturing such a covering system. In that document, it proposes sewing together a support and a cover along two straight and parallel seam lines to form a pocket, then inserting a first pad into this pocket. Other pads can then be arranged between the support and the cover, on either side of the first pad. The support and the cover are then sewn together around the other pads of padding. Finally, seam segments are created which are perpendicular to the two parallel seam lines and which join together the support, the cover, and the pads.

However, insertion of the first pad is only possible if it is rectangular, as explained in said patent. In addition, it is difficult to ensure accurate positioning of the first pad when it is inserted as described in U.S. Pat. No. 8,584,333 B2, which can impact the desired aesthetic effect of the covering system.

U.S. Pat. No. 9,340,134 B2 describes a substantially identical process. However, in U.S. Pat. No. 9,340,134 B1, the parallel seam lines of U.S. Pat. No. 8,584,333 B2 are replaced by longitudinal seam lines which have curved portions to reduce the cross-section of the pocket. In addition, the seam segments are replaced by continuous seam lines, extending transversely in a step-shaped manner.

However, this method is not a satisfactory solution to the problem of positioning the first pad between the support and the cover. In addition, it turns out that the transverse seam lines are fragile.

A need therefore remains for a method for manufacturing a covering system for a motor vehicle seat member that does not have the disadvantages of the prior art. In particular, there is a need for a method for manufacturing a covering system that ensures satisfactory positioning of the block or pads between the support and the cover, while ensuring a relief effect in the covering system.

SUMMARY

For this purpose, a method for manufacturing a covering system for a motor vehicle seat member is provided, comprising the steps of:
i) providing a support, a cover, and a first pad;
ii) associating the support with the cover such that the first pad is left free between the support and the cover;
iii) creating first and second longitudinal seam lines, one on either side of the first pad, the first and second longitudinal seam lines having a main portion extending substantially in a longitudinal direction and joining together the support and the cover, the first and second longitudinal seam lines respectively forming at least one first straight segment and at least one second straight segment, the first and second straight segments respectively extending from the main portion of the first and second longitudinal seam lines in a transverse direction towards the first pad, the first and second straight segments joining together the support, the cover, and the first pad.

Thus, advantageously, the positioning is achieved by placing the pad between the support and the cover. It is then held in position by the transverse seam segments of the first and second longitudinal seam lines. The first pad can therefore be put in place easily, and the maintaining of its position over time is ensured.

Preferably, the method according to various embodiments of the invention comprises one or more of the following features, alone or in combination:
the method comprises a step iv) subsequent to step iii), consisting of:
iv) creating at least one first transverse seam line extending between the main portion of the first longitudinal seam line and the main portion of the second longitudinal seam line, the first transverse seam line joining together the cover, the support, and the first pad such that said at least one first transverse seam line is superimposed on the first straight segment at a first end, and on the second straight segment at a second end;
in step iv), the first transverse seam line joins together, near the first end and/or near the second end, at least three thicknesses of the cover, the support, and preferably the first pad;
the method further comprises the steps consisting of:
v) arranging second and third pads respectively near the first and second longitudinal seam lines; and
vi) joining together the cover and the support along at least one peripheral joining line forming, with the first and second longitudinal seam lines, a first pocket receiving the second pad and a second pocket receiving the third pad, respectively;
in step iii), the first and second longitudinal seam lines respectively form at least one third straight seam segment and at least one fourth straight seam segment, extending, from the main portion of the first longitudinal seam line and of the second longitudinal seam line respectively, on the side opposite from the first pad, the at least one third straight seam segment and the at least one fourth straight seam segment joining together the support and the cover;
the first and second straight seam segments on the one hand, and the third and fourth straight seam segments on the other hand, are offset relative to one another in the longitudinal direction of the main portion of the first longitudinal seam line and/or of the second longitudinal seam line;
the method comprises a step vii), subsequent to step vi), consisting of creating at least one second transverse seam line from the peripheral joining line to the first longitudinal seam line, said at least one first transverse seam line being superimposed, near the main portion of the first longitudinal seam line, with the at least one third straight seam segment, and preferably said at least one second transverse seam line joins together, near the main portion of the first longitudinal seam line, at least three thicknesses of the cover, the support, and more preferably the second or third pad;

each second transverse seam line intersects at least once with the first longitudinal seam line, preferably a plurality of times, and/or each second transverse seam line has a portion extending substantially along the first longitudinal seam line, said portion being formed by back-and-forth stitching alongside the first longitudinal seam line and including the anchoring stitch of the second transverse seam line; and in step iii), the first pad is compressed substantially in a direction going from the cover to the support, at least one stitch of the at least one first straight segment joining together the support, the cover, and the first pad by extending through a lateral side of the cross-section of the first pad.

According to another aspect, the invention relates to a covering system for a motor vehicle seat member, comprising a support, a cover, and a first pad interposed between the support and the cover, wherein the support and the cover are joined together by means of first and second longitudinal seam lines, extending one on either side of the first pad, the first longitudinal seam line having a longitudinal main portion and at least one first transverse straight seam segment extending transversely from the longitudinal main portion of the first longitudinal seam line and, on the same side as the first pad, the at least one first straight seam segment joining together the support, the cover, and the first pad, the second longitudinal seam line having a longitudinal main portion and at least one second transverse straight seam segment extending transversely from the longitudinal main portion of the second longitudinal seam line and on the same side as the first pad, the at least one second straight seam segment joining together the support, the cover, and the first pad.

Preferably the covering system according to various embodiments of the invention comprises one or more of the following features, alone or in combination:

the support and the cover are also joined together with the first pad by means of at least one first transverse seam line, the at least one first transverse seam line extending, near the first longitudinal seam line, parallel to the first transverse straight seam segment, preferably the at least one transverse seam line being superimposed on the first transverse straight seam segment, near the first longitudinal seam line, and the at least one first transverse seam line extending, near the second longitudinal seam line, parallel to the second transverse straight seam segment, preferably the at least one transverse seam line being superimposed on the second transverse straight seam segment, near the second longitudinal seam line;

the covering system comprises a second pad, wherein at least one third transverse seam segment, extending transversely from the main portion of the first longitudinal seam line and on the side opposite from the first pad, secures together the support and the cover, preferably only the support and the cover, and wherein at least one second transverse seam line secures the support, the cover, and the second pad, the at least one second transverse seam line extending, near the first longitudinal seam line, parallel to the third transverse seam segment, the at least one second transverse seam line preferably being superimposed on the third transverse seam segment, near the first longitudinal seam line;

the covering system comprises a third pad, wherein at least one fourth transverse seam segment, extending transversely from the main portion of the second longitudinal seam line on the side opposite from the first pad, secures together the support and the cover, preferably only the support and the cover, and wherein at least one second transverse seam line secures the support, the cover, and the third pad, the at least one second transverse seam line extending, near the second longitudinal seam line, parallel to the fourth transverse seam segment, the at least one second transverse seam line preferably being superimposed on the fourth transverse seam segment, near the second longitudinal seam line;

the first and second transverse seam segments on the one hand, and the third and fourth transverse seam segments, where there are such, on the other hand, are offset from each other in the longitudinal direction.

the second transverse seam line comprises stitches on each side of the first longitudinal seam line, thus forming a passage, preferably multiple ones, on each side of the first longitudinal seam line, and/or a plurality of stitches extending substantially parallel to the main portion of the first longitudinal seam line, forming at least one back-and-forth stitching alongside the main portion of the first longitudinal seam line; and a peripheral seam line secures together the support, the cover, and preferably the second pad, the second transverse lines preferably extending from the peripheral seam line to the nearest among the first longitudinal seam line and the second longitudinal seam line.

Finally, the invention relates to a motor vehicle seat comprising a seating portion and a backrest, at least one among the seating portion and the backrest comprising a frame, padding, and a covering system as described above in all its combinations, around the padding.

BRIEF DESCRIPTION OF THE DRAWINGS

Other aspects, objects, and advantages of the invention will become apparent from reading the following description, with reference to the accompanying drawings where.

DETAILED DESCRIPTION

The same references in the various figures designate identical or similar members. For clarity, some members may not be represented at scale.

In the description which follows, when reference is made to absolute position qualifiers such as the terms "front", "rear", "top", "bottom", "left", "right", etc., or relative qualifiers such as the terms "above", "below", "upper", "lower", etc., or orientation qualifiers such as "horizontal", "vertical", etc., unless otherwise specified these are in reference to the orientation of the figures or of a seat in its normal position of use.

In particular, the longitudinal direction X is the longitudinal direction of the seat. The longitudinal direction of the seat is considered to be the same as the longitudinal direction of the motor vehicle in which the seat is mounted. This longitudinal direction X corresponds to the normal direction of travel of the vehicle. The transverse direction Y of the seat thus corresponds to the transverse or lateral direction of the motor vehicle. This transverse direction corresponds to a direction perpendicular to the normal direction of travel of the vehicle. The transverse direction Y is substantially horizontal. Finally, the vertical direction Z is a vertical direction of the seat, perpendicular to the longitudinal and transverse directions.

Figure 1:
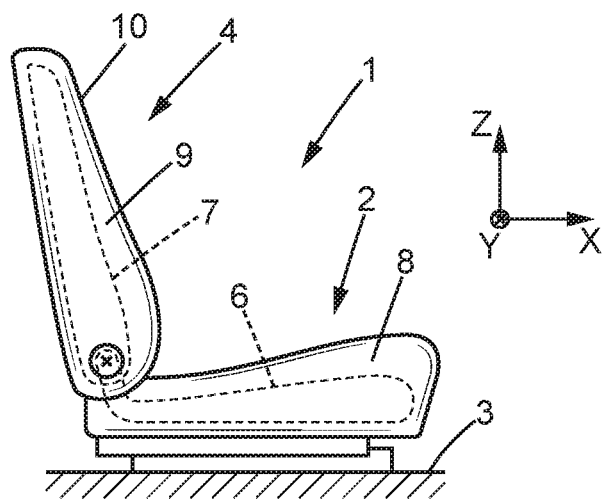
FIG. 1 is a schematic side view of a motor vehicle seat.

FIG. 1 schematically represents a seat 1 of a motor vehicle. Such a seat 1 conventionally comprises a seating portion 2 mounted on a floor 3 of the motor vehicle. The seating portion 2 may be fixed to the floor 3, for example permanently or removably, by means of a fastening device (not shown). The seating portion 2 may also be mounted on the floor 3 in a manner that allows adjustment, for example sliding via an adjustment system 5 comprising rails, as shown.

The seat 1 of a motor vehicle also has a backrest 4. The backrest 4 is mounted at the rear of the seating portion 2. The seating portion 2 thus has a rear at the backrest 4, and a front on the side opposite from the backrest 4. This orientation can define the front-rear direction of the motor vehicle seat 1, regardless of the orientation of the seat within the vehicle. In the nominal position of use, shown, in which an occupant can sit in the seat 1, the seating portion 2 extends close to the horizontal, and the backrest 4 extends close to the vertical. Where appropriate, the backrest 4 is mounted to be movable, or even adjustable relative to the seating portion, in particular according to a degree of freedom in pivoting about a transverse horizontal axis.

According to another example, the backrest 4 may be mounted on the floor, where appropriate in an adjustable manner, and the seating portion 2 is mounted on the backrest.

According to some embodiments, the backrest 4 and the seating portion 2 may be provided with a width that enables accommodating a single occupant of the seat, or, conversely, several occupants of the seat.

Here, the term "seat member" refers to the seating portion 2 and/or the backrest 4 and/or a headrest. In the following, a description is provided where the seat member concerned is the backrest 4. However, unless explicitly stated otherwise, this description can also be applied to the case where the seat member concerned is the seating portion 2 or a headrest.

As illustrated in FIG. 1, the seating portion 2 and the backrest 4 each comprise a rigid structure 6, 7 or frame, for example a metal frame, supporting a respective padding 8, 9. The padding 8, 9 consists of one or more blocks of foam preventing the occupant from feeling the rigid structure 6, 7. A covering system 10 covers the padding 8 of the seating portion and the rigid structure 6 of the seating portion, and/or the padding 9 of the backrest and the rigid structure 7 of the backrest. The covering system 10 thus hides from view the rigid structure 6 and the padding 8 of the seating portion 2 and/or the padding 9 and the rigid structure 7 of the backrest 4. The assembly of padding 8, 9 and covering system 10 can be referred to as the trim.

The covering system 10 is a thin system, in other words a system in which one dimension, its thickness, is significantly smaller than its other dimensions, its length and its width. For example, the thickness of the covering system is five times smaller, preferably ten times smaller, more preferably twenty times smaller, than its length and width. The covering system has a visible outer face 10a and an inner face 10b opposite to the outer face 10a. The inner face 10b is facing the padding 8, 9.

Figure 2:
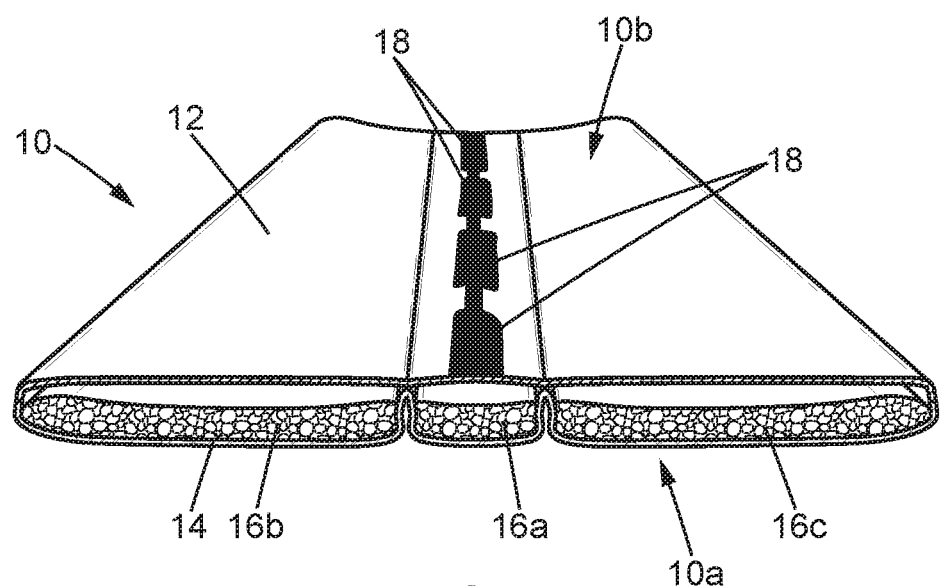
FIG. 2 is a perspective view of an exemplary covering system for a motor vehicle seat member that can be mounted on the seat of FIG. 1.
Figure 3:
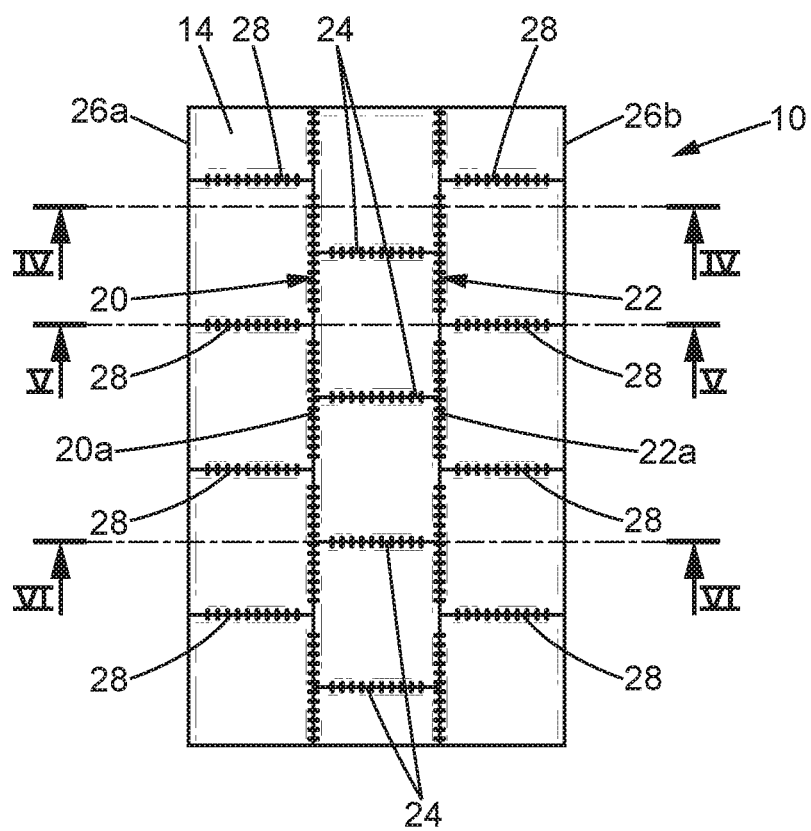
FIG. 3 is a front view of the covering system of FIG. 2.
Figure 4:
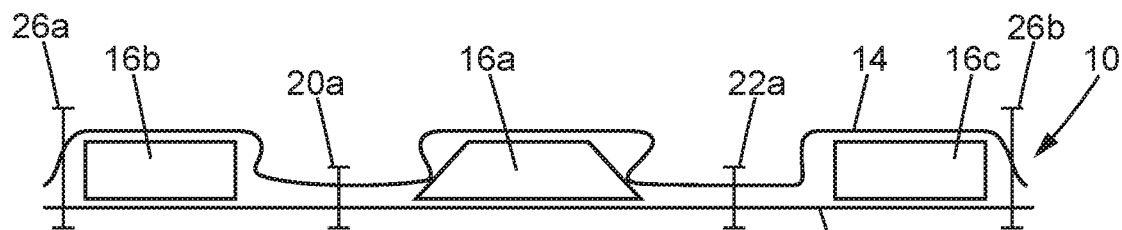
FIGS. 4 to 6 schematically illustrate the covering system of FIG. 2, respectively along section lines IV-IV, V-V, and VI-VI.
Figure 5:
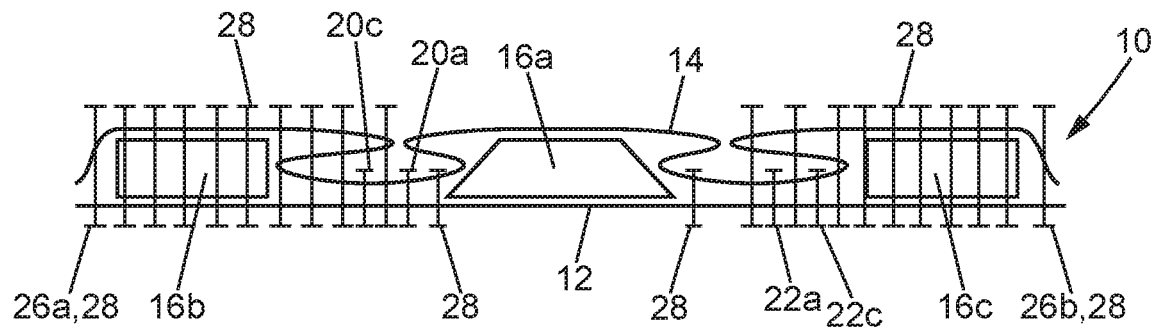
Figure 6:
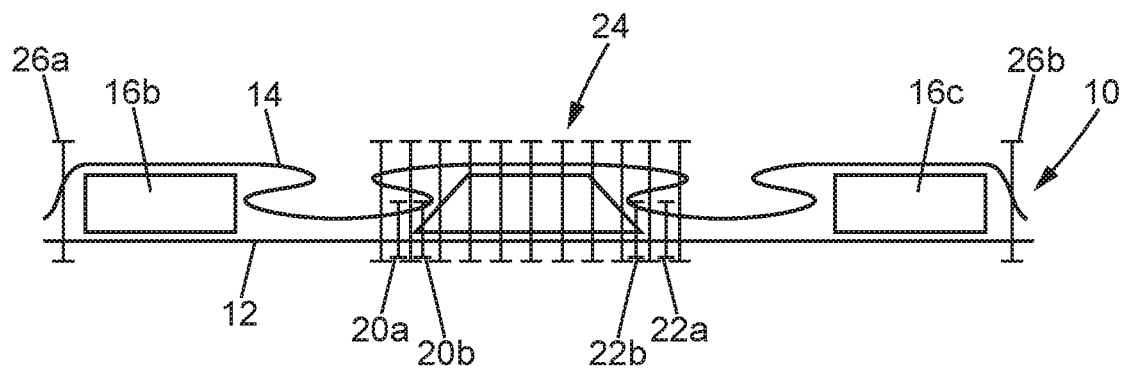

As can be seen in particular in FIG. 2, the covering system 10 is essentially formed of three layers:
  a support 12 forming the inner face 10b of the covering system;
  a cover 14 forming the outer face 10a of the covering system 10; and
  several pads 16a, 16b, 16c arranged between the support 12 and the cover 16.

In the example of FIG. 2, the inner face 10b of the covering system 10 is provided with one or more strips 18 of loop or hook textile for engaging with a complementary strip of textile fixed to the padding covered by the covering system 10, to ensure that the covering system 10 is held in position on the seat. The attachment of the covering system 10 to a seat 1 is advantageously supplemented by means known to those skilled in the art, such as snaps or one or more drawstrings.

The support 12 is for example a mesh 3D fabric or a nonwoven textile. In the latter case, the support 12 may have cutouts to make it more flexible. The thickness of the support is for example between 1 and 10 mm, preferably between 3 and 5 mm.

The cover 14 may be of any suitable textile material. Preferably, however, the cover is of leather or imitation leather. These latter materials have a relatively high rigidity, ensuring that the aesthetics of the covering system 10 will last over time. Particularly when the cover 14 is of leather or imitation leather, the cover 14 may have a thickness between 1 and 5 mm, preferably between 1 and 2 mm.

The pads are for example of reticulated foam. The thickness of these foam pads is for example between 10 and 20 mm, preferably between 12 and 15 mm.

As is more particularly visible in FIGS. 3 to 6, the support 12 and the cover 14 are joined together by means of first 20 and second 22 longitudinal seam lines. Each longitudinal seam line 20, 22 extends one on either side of the first pad 16a, all along this pad 16a.

The first longitudinal seam line 20 comprises a longitudinal main portion 20a, which is straight here, a plurality of first transverse straight seam segments 20b, and, in the illustrated example, a plurality of second transverse straight seam segments 20c.

The main longitudinal portion 20a joins together the cover 14 and the support 12. In other words, each stitch of the longitudinal main portion 20a passes through the cover 14 and the support 12. However, the stitches of the longitudinal main portion 20a do not pass through the first pad 16a.

Each first transverse straight seam segment 20b extends transversely from the longitudinal main portion 20a of the first longitudinal seam line 20 and on the same side as the first pad 16a. Here, for example, each first transverse straight seam segment 20b extends perpendicularly from the longitudinal main portion 20a of the first longitudinal seam line 20 and on the same side as the first pad 16a. Each first transverse straight seam segment 20b joins together the support 12, the cover 14, and the first pad 16a. In other words, the stitches of the first transverse straight seam segments 20b pass through the support 12, the cover 14, and the first pad 16a. Each first straight segment 20b may be formed by means of a single stitch distanced from the main portion 20a of the first longitudinal seam line 20.

Each second transverse straight seam segment 20c extends transversely from the longitudinal main portion 20a of the first longitudinal seam line 20 and on the side opposite from the first pad 16a. Here, for example, each second transverse straight seam segment 20c extends perpendicularly from the longitudinal main portion 20a of the first longitudinal seam line 20 and on the side opposite from the first pad 16a. Each second transverse straight seam segment 20c joins together the support 12 and the cover 14. In other words, the stitches of the second transverse straight seam segments 20c pass through the support 12 and the cover 14 only. Each second straight segment 20c may be formed by means of a single stitch distanced from the main portion 20a of the first longitudinal seam line 20.

The first and second straight seam segments 20b, 20c are offset from each other in the longitudinal direction, in other words along the main portion 20a of the first longitudinal line 20.

Similarly, the second longitudinal seam line 22 comprises a longitudinal main portion 22a, which is straight here, a plurality of third transverse straight seam segments 22b, and, in the illustrated example, a plurality of fourth transverse straight seam segments 22c. The third and fourth seam segments 22b, 22c are offset from each other in the longitudinal direction, in other words along the main portion 22a of the second longitudinal line 22.

The main longitudinal portion 22a joins together the cover 14 and the support 12. In other words, each stitch of the longitudinal main portion 22a passes through the cover 14 and the support 12. However, the stitches of the longitudinal main portion 22a do not pass through the first pad 16a.

Each third transverse straight seam segment 22b extends transversely from the longitudinal main portion 22a of the second longitudinal seam line 22 and on the same side as the first pad 16a. Here, for example, each third transverse straight seam segment 22b extends perpendicularly from the longitudinal main portion 22a of the second longitudinal seam line 22 and on the same side as the first pad 16.

Each third transverse straight seam segment 22b joins together the support 12, the cover 14, and the first pad 16a. In other words, the stitches of the second transverse straight seam segments 22b pass through the support 12, the cover 14, and the first pad 16a.

Each third straight segment 22b may be formed by means of a single stitch distanced from the main portion 22a of the second longitudinal seam line 20.

Each third straight segment 22b may be aligned with a first straight segment 20b.

Furthermore, each fourth transverse straight seam segment 22c extends transversely from the longitudinal main portion 22a of the second longitudinal seam line 22 and on the side opposite from the first pad 16a. Here, for example, each fourth transverse straight seam segment 22c extends perpendicularly from the longitudinal main portion 22a of the second longitudinal seam line 22 and on the side opposite from the first pad 16a. Each fourth transverse straight seam segment 22c joins together the support 12 and the cover 14. In other words, the stitches of the fourth transverse straight seam segments 22c pass through the support 12 and the cover 14 only.

Each fourth straight segment 22c may be formed by means of a single stitch distanced from the main portion 22a of the second longitudinal seam line 22.

Each fourth straight segment 22c may be aligned with a second straight segment 20c.

Advantageously, the main portion 20a, 22a of the first longitudinal seam line 20 and/or of the second longitudinal seam line 22 thus ensures the attachment of the support 12 and the cover 14, while the first straight seam segments 20b and/or the third straight seam segments 22b ensure that the first pad 16a is held precisely in position relative to the support 12 and the cover 14.

It should be noted here that the first pad 16a is preferably left free relative to the support 12 and the cover 14, except at the longitudinal seam lines 20, 22. In particular, the first pad 16a is advantageously not bonded to the support 12 or to the cover 14.

In addition, four first transverse seam lines 24 join together the support 12, the cover 14, and the first pad 16a. In other words, the stitches of these four transverse seam lines 24 extend through the support 12, the cover 14, and the first pad 16a.

These first transverse seam lines 24 extend, near the main portions 20a, 22a of the first and second longitudinal seam lines 20, 22, parallel to the first and third transverse straight seam segments 20b, 22b. Preferably, the first transverse seam lines 24 are superimposed, near the main portions 20a, 22a of the first and second longitudinal seam lines 20, 22, with the first and third transverse straight seam segments 20b, 22b respectively. This creates a relief effect for the cover 14 between the first and second longitudinal seam lines 20, 22 on the one hand, and two consecutive first transverse seam lines 24 on the other hand.

Advantageously, at the ends of the first transverse seam lines 24, respectively near the first and second longitudinal seam lines 20, 22, the first transverse seam lines 24 join at least three thicknesses of the cover 14, the support 12, and preferably the first pad 16a. This accentuates the relief effect of the covering system 10. Alternatively, at the ends of the transverse seam lines 24, respectively near the first and second longitudinal seam lines 20, 22, the first transverse seam lines 24 join a single thickness of the cover 14 and the support 12, and possibly the first pad 16a.

On each side of the first pad 16a, the covering system 10 here comprises two other pads 16b, 16c which are substantially symmetrical relative to a median plane of the covering system 10. Here, these two pads 16b, 16c are substantially rectangular. In the illustrated example, each of the two pads 16b, 16c is arranged between the support 12 and the cover 14, between the main portion 20a, 22a of a respective longitudinal seam line 20, 22, and a peripheral seam line 26a, 26b. Each peripheral seam line 26a, 26b here is created along half the perimeter of the covering system 10. These peripheral seam lines 26a, 26b may for example be created in two distinct angular directions.

Second transverse seam lines 28 which extend from a respective peripheral seam line 26a, 26b to a respective longitudinal seam line 20, 22, the closest one, join together the support 12, the cover 14, and one among the second and third pads 16b, 16c.

The second transverse seam lines 28 advantageously extend, near the first and second longitudinal seam lines 20, 22, substantially parallel to the second and fourth transverse straight seam segments 20c, 22c. More preferably, the transverse seam lines 28 are superimposed, near the first and second longitudinal seam lines 20, 22, with the second and fourth transverse straight seam segments 20c, 22c respectively.

Advantageously, near the first and second longitudinal seam lines 20, 22, the transverse seams 28 join together three thicknesses of the cover 14, the support 12, and possibly the second or third pad 16b, 16c.

This improves the relief effect of the covering system 10.

Figure 7:
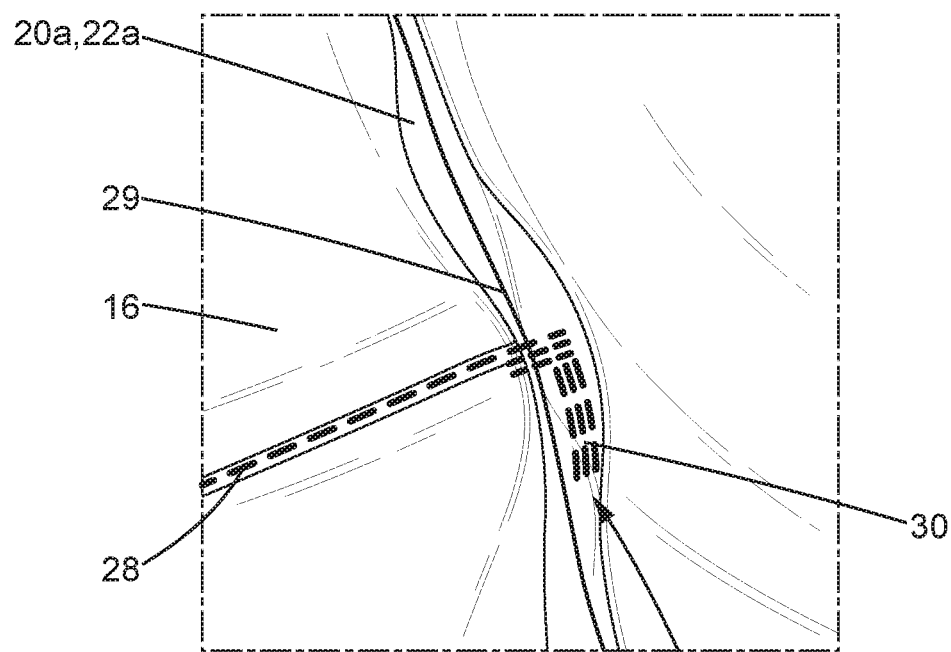
FIGS. 7 and 8 illustrate details of the covering system of FIG. 2.
Figure 8:
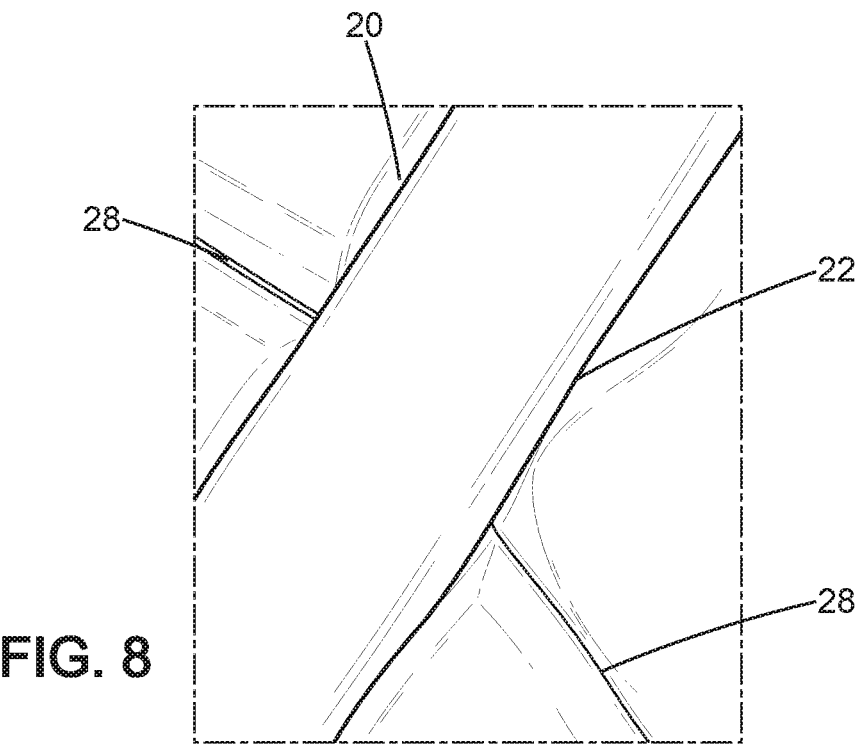

Furthermore, as illustrated in FIG. 7, the transverse seam lines 28 here comprise stitches on each side of the main portions 20a, 22a of the first and second longitudinal seam lines 20, 22, thus forming a passage 29, preferably multiple ones, on each side of a respective longitudinal seam line 20, 22. The second transverse seam line 28 illustrated in FIG. 7 further comprises segments 30, formed by a stitch or a plurality of stitches, extending substantially parallel to the main portion 20a, 22a of a respective longitudinal seam line 20, 22, with at least one back-and-forth stitching, preferably at least three, alongside the main portion 20a, 22a of the closest longitudinal seam line 20, 22. The anchoring stitch 31 of the second transverse seam line 28 is preferably made at the end of these segments 30 extending along the main portion 20a, 22a of the longitudinal seam line 20, 22.

This gives greater mechanical strength to these second transverse lines 28, particularly in comparison to the case where these lines are in the form of transverse continuous lines forming steps. Here, in effect, the first transverse lines 24 between the first and second longitudinal seam lines, and the second transverse lines 28 between a peripheral line and the nearest longitudinal seam line, are independent.

In addition, the anchoring stitch 31 of these second transverse lines 28 is thus hidden in the relief of the cover 14 formed by the first pad 16a. This contributes to obtaining a particularly satisfactory aesthetic result for the covering system 10.

Figure 9:
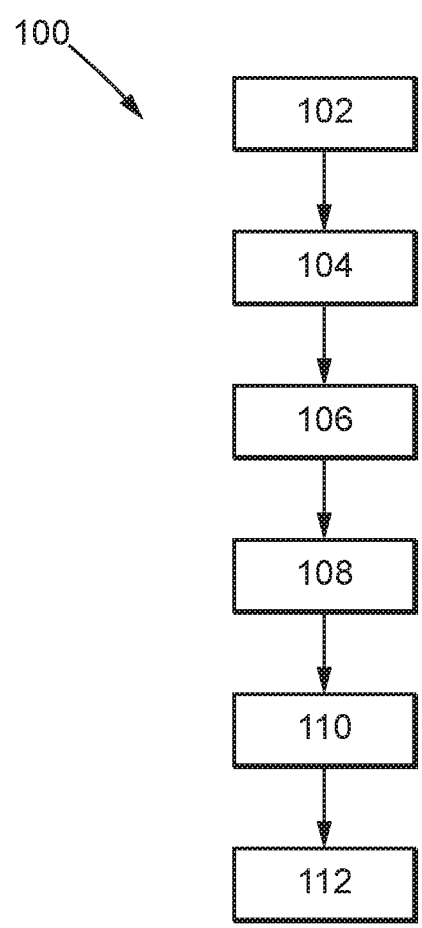
FIG. 9 illustrates a flowchart of a method for manufacturing the covering system of FIG. 2.

In the following, an example of a method for manufacturing a covering system 10 as described above is now described, its flowchart shown in FIG. 9.

In a first step 102, a support 12, a cover 14, and a first pad 16a are provided. Advantageously, the support 12, the cover 14, and the pad 16 are provided after having been cut to the desired dimensions, for example using templates. In addition, the support 12 is advantageously provided with one or more strips of loop or hook fabric 18 fixed on its surface, intended for forming the inner face 10b of the covering system 10.

Next, during a step 104, the support 12 is associated with the cover 14 so that the first pad 16a is left free between the support 12 and the cover 14. Thus, the pad 16a is advantageously not fixed, in particular not glued, to the support 12 and/or to the cover 14.

Figure 10:
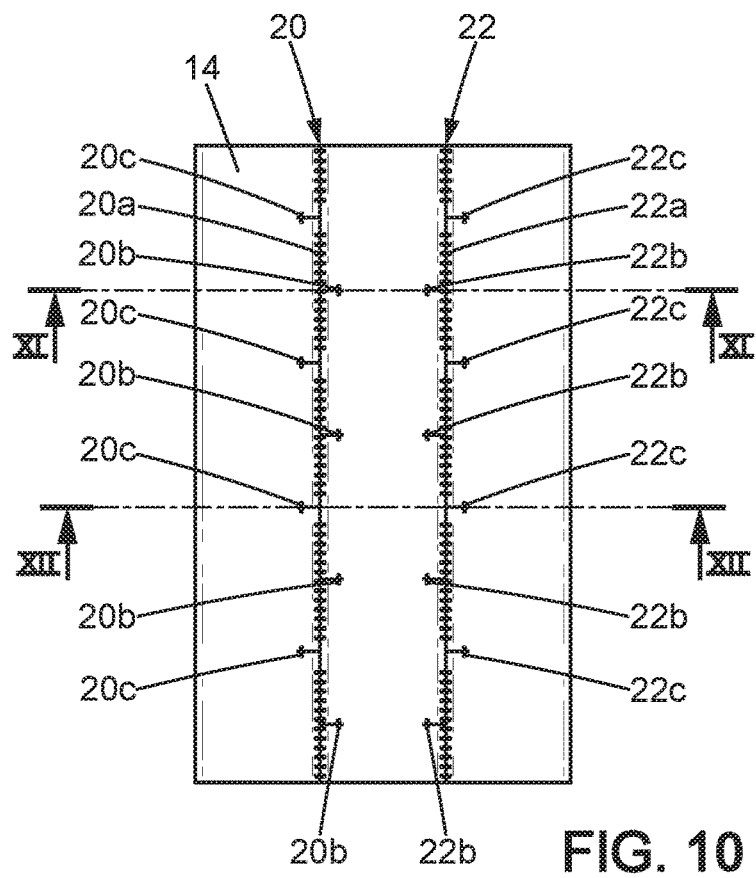
FIG. 10 illustrates the covering system of FIG. 2 after a first step of the method of FIG. 9.
Figure 11:
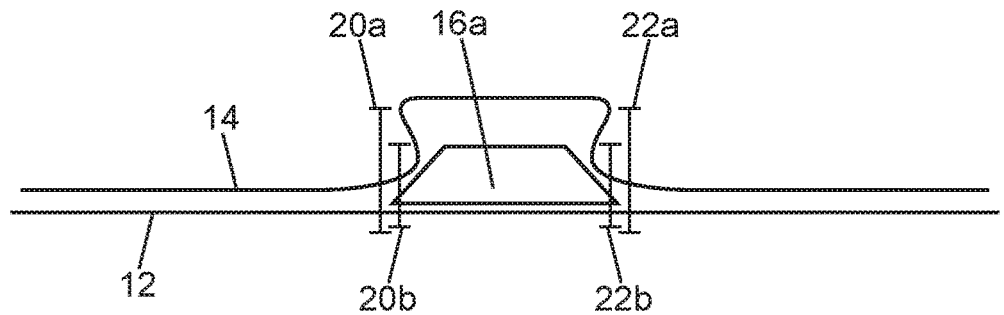
FIGS. 11 and 12 illustrate sectional views, respectively along section lines XI-XI and XII-XII of the covering system of FIG. 10.
Figure 12:
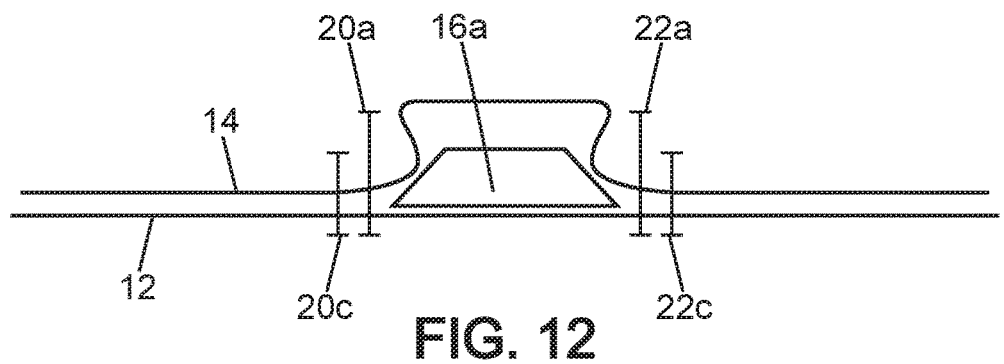

Then, during a step 106 illustrated in FIGS. 10 to 12, the first and second longitudinal seam lines 20, 22 are formed, one on each side of the first pad 16a.

In the step 108 which follows, a second 16b and third pad 16b, 16c are arranged one on each side of the first pad 16a, respectively near the first and second longitudinal seam line 20, 22.

Figure 13:
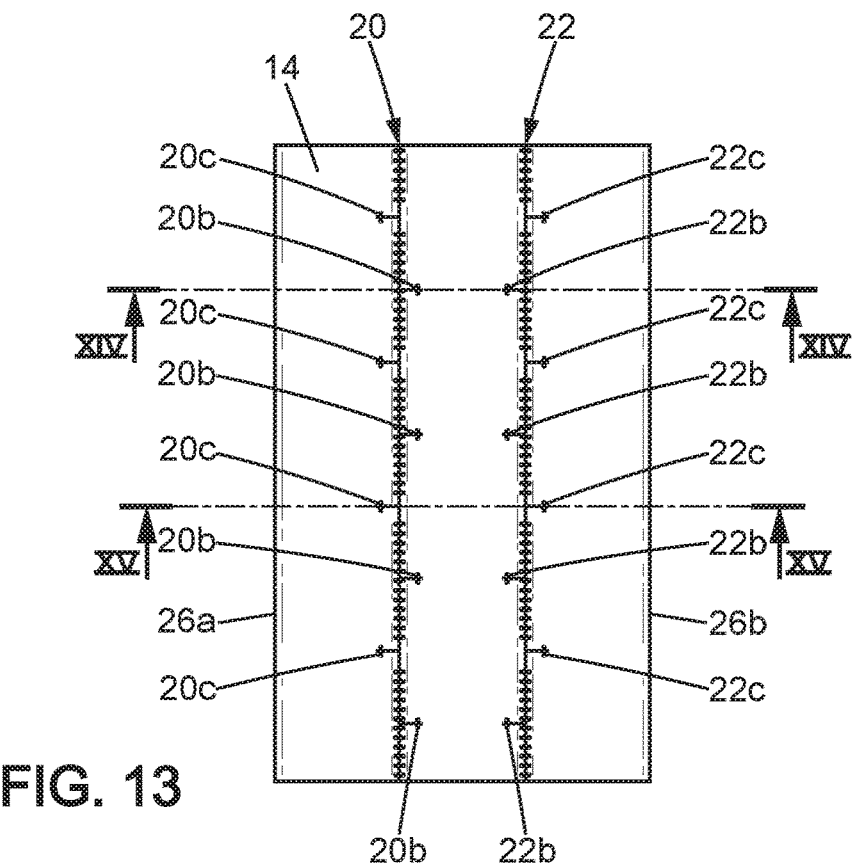
FIG. 13 illustrates the covering system of FIG. 10 after a second step of the method of FIG. 9.
Figure 14:
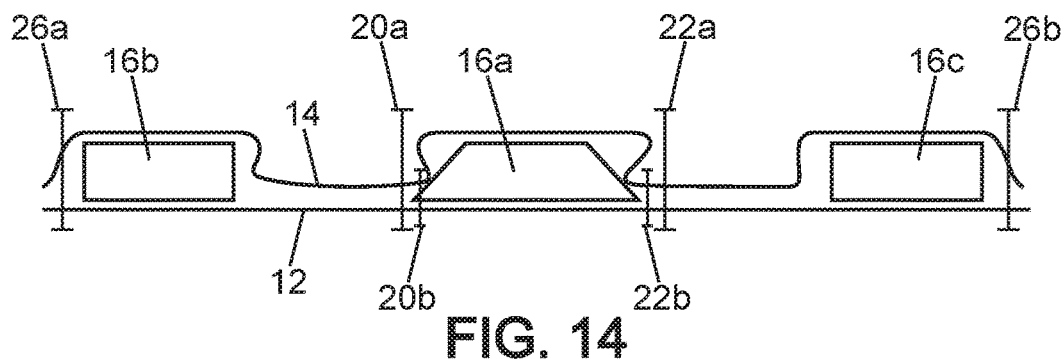
FIGS. 14 and 15 show sectional views, respectively along section lines XIV-XIV and XV-XV of the covering system of FIG. 13.
Figure 15:
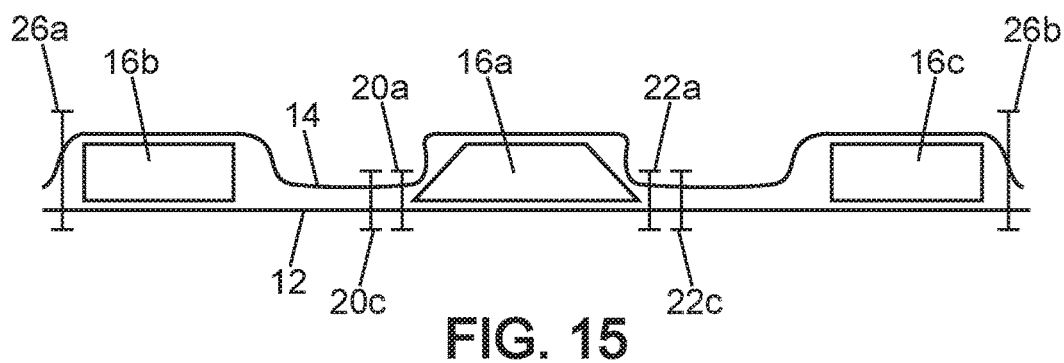

Then, during a step 110 illustrated by FIGS. 13 to 15, a peripheral seam line 26a, 26b is created in order to join together at least the support 12 and the cover 14, around the pads 16b, 16c. Here, two such seam lines 26a, 26b are created, each seam line 26a, 26b running substantially halfway along the perimeter of the covering system 10 and thus forming, with the nearest longitudinal seam line 20, 22, a pocket for receiving a respective pad 16b, 16c.

Next, during a step 112, first transverse seam lines 24 extending between the main portion 20a of the first seam line 20 and the main portion 22a of the second seam line 22a are created. As explained above, the first transverse seam lines 24 join together the cover 14, the support 12, and the first pad 16a, such that the first transverse seam lines 24 are superimposed, at a first end, on the first transverse straight segments 20b, and are superimposed, at a second end, on the third transverse straight segments 22b.

It is also advantageous that in this step 112, the first transverse seam lines 24 join together, at one or both ends thereof, several thicknesses of the cover 14, folded into an S, with the support 12 and possibly with the first pad 16a.

Second transverse seam lines 28 are also created in this step 112. Advantageously, each second transverse seam line 28 is created from a peripheral seam line 26a, 26b towards a respective longitudinal seam line 20, 22, the closest one. Thus, the material of the cover 14 is pushed towards the longitudinal seam line 20, 22 and it is then easier to sew, with the aid of a second transverse seam line 28, several thicknesses of the cover 14 to the support 12 and possibly the second 16b or third 16c pad 16b, 16c. This sewing of several thicknesses of the cover 14 is also facilitated by the creation of the second and fourth transverse seam segments 20c, 22c, which "force" the cover 14 to fold at their location when the second transverse seam lines 28 are superimposed on these second and fourth transverse seam segments 20c, 22c, pushing the cover 14 towards the first pad 16a.

In this step 112, the anchoring of the second transverse seam lines 28 is also established, by traversing a longitudinal seam line 20, 22 several times from one side to the other and/or by back-and-forth stitching alongside this longitudinal seam line 20, 22, so as to solidify the anchoring stitch and conceal it under the relief of the cover 14 shaped by the presence of the first pad 16a.

The invention is not limited to the single example described above but is instead capable of numerous variants accessible to those skilled in the art.

The longitudinal seam lines may be oriented exactly in the longitudinal direction of the covering system, or may form an angle, preferably less than 45°, with this longitudinal direction. Similarly, the segments and transverse lines may be oriented exactly in a transverse direction perpendicular to the longitudinal direction, or on the contrary may form an angle, preferably less than 45°, with this longitudinal direction.

Moreover, the method may be supplemented by steps of assembling lateral and/or longitudinal panels, the covering system 10 illustrated in the figures possibly being intended to cover only a portion of the motor vehicle seat member, for example the passenger contact area of the seating portion or backrest.

As used in this specification and claims, the term "and/or" is to be construed as an inclusive OR. Therefore, for example, the phrase "A, B, and/or C" is to be interpreted as covering any one or more of the following: "A"; "B"; "C"; "A and B"; "A and C"; "B and C"; and "A, B, and C."

The invention claimed is:

1. A method for manufacturing a covering system for a motor vehicle seat member, comprising the steps of:
   i) providing a support, a cover, and a first pad;
   ii) associating the support with the cover such that the first pad is left free between the support and the cover;
   iii) creating first and second longitudinal seam lines, one on either side of the first pad, the first and second longitudinal seam lines having a main portion extending substantially in a longitudinal direction and joining together the support and the cover, the first and second longitudinal seam lines respectively forming, in addition to a longitudinal main portion of the first longitudinal seam line and a longitudinal main portion of the second longitudinal seam line, at least one first straight segment and at least one second straight segment, the first and second straight segments respectively extending from the main portion of the first and second longitudinal seam lines in a transverse direction towards the first pad, the first and second straight segments joining together the support, the cover, and the first pad, wherein the at least one first straight segment extends only partially toward the second longitudinal seam line; and
   further comprising subsequent to step iii), a step of:
   iv) creating at least one first transverse seam line extending between the main portion of the first longitudinal seam line and the main portion of the second longitudinal seam line, the first transverse seam line joining together the cover, the support, and the first pad such that said at least one first transverse seam line is superimposed on the first straight segment at a first end, and on the second straight segment at a second end.

2. The method according to claim 1, wherein in step iv), the first transverse seam line joins together, near the first end and/or near the second end, at least three thicknesses of the cover and the support.

3. The method according to claim 1, further comprising the steps of:
   v) arranging second and third pads respectively near the first and second longitudinal seam lines; and
   vi) joining together the cover and the support along at least one peripheral joining line forming, with the first and second longitudinal seam lines, a first pocket receiving the second pad and a second pocket receiving the third pad, respectively.

4. The method according to claim 1, wherein, in step iii), the first and second longitudinal seam lines respectively form at least one third straight seam segment and at least one fourth straight seam segment, extending, from the main portion of the first longitudinal seam line and of the second longitudinal seam line respectively, on the side opposite from the first pad, the at least one third straight seam segment and the at least one fourth straight seam segment joining together the support and the cover.

5. The method according to claim 4, wherein the first and second straight seam segments on the one hand, and the third and fourth straight seam segments on the other hand, are offset relative to one another in the longitudinal direction of the main portion of the first longitudinal seam line and/or of the second longitudinal seam line.

6. The method according to claim 3, wherein, in step iii), the first and second longitudinal seam lines respectively form at least one third straight seam segment and at least one fourth straight seam segment, extending, from the main portion of the first longitudinal seam line and of the second longitudinal seam line respectively, on the side opposite from the first pad, the at least one third straight seam segment and the at least one fourth straight seam segment joining together the support and the cover,
   the method further comprising a step vii), subsequent to step vi), consisting of creating at least one second transverse seam line from the peripheral joining line to the first longitudinal seam line, said at least one first transverse seam line being superimposed, near the main portion of the first longitudinal seam line, with the at least one third straight seam segment.

7. The method according to claim 6, wherein in step vii) said at least one second transverse seam line joins together, near the main portion of the first longitudinal seam line, at least three thicknesses of the cover and the support.

8. The method according to claim 6, wherein in step vii) said at least one second transverse seam line joins together, near the main portion of the first longitudinal seam line, at least three thicknesses of the cover, the support, and at least one of the second and third pad.

9. The method according to claim 6, wherein each second transverse seam line intersects at least once with the first longitudinal seam line and/or wherein each second transverse seam line has a portion extending substantially alongside the first longitudinal seam line, said portion being formed by back-and-forth stitching alongside the first longitudinal seam line and including the anchoring stitch of the second transverse seam line.

10. The method according to claim 1, wherein in step iii) the first pad is compressed substantially in a direction going from the cover to the support, at least one stitch of the at least one first straight segment joining together the support, the cover, and the first pad by extending through a lateral side of the cross-section of the first pad.

11. A covering system for a motor vehicle seat member, comprising a support, a cover, and a first pad interposed between the support and the cover,
   wherein the support and the cover are joined together by first and second longitudinal seam lines extending one on either side of the first pad,
   the first longitudinal seam line having a longitudinal main portion, and at least one first transverse straight seam segment extending transversely from the longitudinal main portion of the first longitudinal seam line and on the same side as the first pad, the at least one first straight seam segment joining together the support, the cover, and the first pad, wherein the at least one first transverse straight seam segment extends only partially toward the second longitudinal seam line,
   the second longitudinal seam line having a longitudinal main portion, and at least one third transverse straight seam segment extending transversely from the longitudinal main portion of the second longitudinal seam line and on the same side as the first pad, the at least one third straight seam segment joining together the support, the cover, and the first pad, wherein the support and the cover are also joined together with the first pad by at least one first transverse seam line, the at least one first transverse seam line extending, near the first longitudinal seam line, parallel to the first transverse straight seam segment, and
   the at least one first transverse seam line extending, near the second longitudinal seam line, parallel to the third transverse straight seam segment.

12. The covering system according to claim 11, wherein the support and the cover are also joined together with the first pad by at least one first transverse seam line, the at least one first transverse seam line being superimposed on the first transverse straight seam segment, near the first longitudinal seam line, and/or the at least one first transverse seam line being superimposed on the third transverse straight seam segment, near the second longitudinal seam line.

13. The covering system according to claim 11, comprising a second pad, wherein at least one second transverse seam segment, extending transversely from the main portion of the first longitudinal seam segment and on the side opposite from the first pad, secures together the support and the cover, and wherein at least one second transverse seam line secures the support, the cover, and the second pad, the at least one second transverse seam line extending, near the first longitudinal seam line, parallel to the second transverse seam segment.

14. The covering system according to claim 13, wherein the at least one second transverse seam line is superimposed with the second transverse seam segment, near the first longitudinal seam line.

15. The covering system according to claim 13, comprising a third pad, wherein at least one fourth transverse seam segment, extending transversely from the main portion of the second longitudinal seam line on the side opposite from the first pad, secures together the support and the cover, and wherein at least one second transverse seam line secures the support, the cover, and the third pad, the at least one second transverse seam line extending, near the second longitudinal seam line, parallel to the fourth transverse seam segment.

16. The covering system according to claim 15, wherein the at least one second transverse seam line is superimposed on the fourth transverse seam segment, near the second longitudinal seam line.

17. The covering system according to claim 15, wherein the first and second transverse seam segments on the one hand, and the third and fourth transverse seam segments, on the other hand, are offset from each other in the longitudinal direction.

18. A motor vehicle seat comprising a seating portion and a backrest, at least one among the seating portion and the backrest comprising a frame, a padding, and a covering system according to claim 11, around the padding.

19. A covering system for a motor vehicle seat member, comprising a support, a cover, and a first pad interposed between the support and the cover, wherein the support and the cover are joined together by first and second longitudinal seam lines extending one on either side of the first pad, the first longitudinal seam line having a longitudinal main portion, and at least one first transverse straight seam segment extending transversely from the longitudinal main portion of the first longitudinal seam line and on the same side as the first pad, the at least one first straight seam segment joining together the support, the cover, and the first pad, the second longitudinal seam line having a longitudinal main portion, and at least one other transverse straight seam segment extending transversely from the longitudinal main portion of the second longitudinal seam line and on the same side as the first pad, the at least one second straight seam segment joining together the support, the cover, and the first pad, and a transverse seam line superimposed over and stitched on top of the at least one first transverse straight seam segment of the first longitudinal seam line and the at least one other transverse straight seam segment of the second longitudinal seam line.

* * * * *